(12) United States Patent
Nassi et al.

(10) Patent No.: US 12,112,169 B2
(45) Date of Patent: Oct. 8, 2024

(54) REGISTER FREEING LATENCY

(71) Applicant: Arm Limited, Cambridge (GB)

(72) Inventors: Luca Nassi, Antibes (FR); Geoffray Matthieu Lacourba, Nice (FR); Cédric Denis Robert Airaud, Saint Laurent du Var (FR); Albin Pierrick Tonnerre, Nice (FR)

(73) Assignee: Arm Limited, Cambridge (GB)

( * ) Notice: Subject to any disclaimer, the term of this patent is extended or adjusted under 35 U.S.C. 154(b) by 97 days.

(21) Appl. No.: 18/096,141

(22) Filed: Jan. 12, 2023

(65) Prior Publication Data

US 2024/0241723 A1  Jul. 18, 2024

(51) Int. Cl.
*G06F 13/40* (2006.01)
*G06F 9/30* (2018.01)
*G06F 9/38* (2018.01)

(52) U.S. Cl.
CPC ...... *G06F 9/30098* (2013.01); *G06F 9/30094* (2013.01); *G06F 9/384* (2013.01)

(58) Field of Classification Search
None
See application file for complete search history.

(56) References Cited

U.S. PATENT DOCUMENTS

| | | | | |
|---|---|---|---|---|
| 9,372,825 B1* | 6/2016 | Shee | ............... | G06F 15/17331 |
| 10,007,434 B1* | 6/2018 | Martin | ................ | G06F 3/0611 |
| 2001/0016905 A1* | 8/2001 | Kasamatsu | ........... | G06F 1/1632 |
| | | | | 713/100 |
| 2004/0133766 A1* | 7/2004 | Abraham | ............ | G06F 9/30127 |
| | | | | 712/228 |
| 2012/0033659 A1* | 2/2012 | Zhang | ............... | H04W 36/0033 |
| | | | | 370/338 |
| 2020/0097392 A1* | 3/2020 | Pizlo | ................... | G06F 12/0284 |
| 2020/0379684 A1* | 12/2020 | Subbarao | .............. | G06F 3/0608 |
| 2023/0315296 A1* | 10/2023 | Utevsky | .............. | G06F 12/0875 |

OTHER PUBLICATIONS

Arm Limited, Arm-DAI-0548, REL-01.1, Learn the architecture—SVE and SVE2 programming examples—Chapter B1 Vector maximum element, 2019-2021, 3 pages.

* cited by examiner

*Primary Examiner* — Hyun Nam
(74) *Attorney, Agent, or Firm* — NIXON & VANDERHYE P.C.

(57) ABSTRACT

A data processing apparatus is provided. Instruction send circuitry sends an instruction to an external processor to be executed by the external processor. Allocation circuitry allocates a specified one of several registers for a result of the instruction having been executed on the external processor and data receive circuitry receives the result of the instruction having been executed on the external processor and stores the result in the specified one of the several registers. In response to a condition being met: the specified one of the several registers is dereserved prior to the result being received by the data receive circuitry, and the result is discarded by the data receive circuitry when the result is received by the data receive circuitry.

16 Claims, 5 Drawing Sheets

```
1    .LoopStart:
2    LD1H z6.h, p4/Z, [x0, x8, lsl #1]
3    INCH z11.h
4    INCH x8
5    CMPGT p6.h, p4/Z, z6.h, z5.h
6    SMAX z5.h, p4/M, z5.h, z6.h
7    SEL z10.h, p6, z11.h, z10.h
8    WHILELT p4.h, x8, x1
9    B.FIRST .LoopStart
```

FIG. 2

REGISTER FREEING LATENCY

TECHNICAL FIELD

The present disclosure relates to data processing and particularly to register handling.

DESCRIPTION

Prior to an instruction being executed, resources are reserved or allocated for the result of any execution of that instruction. If numerous high latency instructions are executed, then the processor may stall due to all resources having been reserved. This is undesirable since it can reduce processor efficiency and take longer for programs to execute.

SUMMARY

Viewed from a first example configuration, there is provided a data processing apparatus comprising: instruction send circuitry configured to send an instruction to an external processor to be executed by the external processor; allocation circuitry configured to allocate a specified one of a plurality of registers for a result of the instruction having been executed on the external processor; and data receive circuitry configured to receive the result of the instruction having been executed on the external processor and to store the result in the specified one of the plurality of registers, wherein in response to a condition being met: the specified one of the plurality of registers is dereserved prior to the result being received by the data receive circuitry, and the result is discarded by the data receive circuitry when the result is received by the data receive circuitry.

Viewed from a second example configuration, there is provided a data processing method comprising: sending an instruction to an external processor to be executed by the external processor; allocating a specified one of a plurality of registers for a result of the instruction having been executed on the external processor; and receiving the result of the instruction having been executed on the external processor and to store the result in the specified one of the plurality of registers, wherein in response to a condition being met: the specified one of the plurality of registers is dereserved prior to the result being received by the data receive circuitry, and the result is discarded by the data receive circuitry when the result is received by the data receive circuitry.

Viewed from a third example configuration, there is provided a non-transitory computer-readable medium to store computer-readable code for fabrication of a data processing apparatus comprising: instruction send circuitry configured to send an instruction to an external processor to be executed by the external processor; allocation circuitry configured to allocate a specified one of a plurality of registers for a result of the instruction having been executed on the external processor; and data receive circuitry configured to receive the result of the instruction having been executed on the external processor and to store the result in the specified one of the plurality of registers, wherein in response to a condition being met: the specified one of the plurality of registers is dereserved prior to the result being received by the data receive circuitry, and the result is discarded by the data receive circuitry when the result is received by the data receive circuitry.

BRIEF DESCRIPTION OF THE DRAWINGS

The present invention will be described further, by way of example only, with reference to embodiments thereof as illustrated in the accompanying drawings, in which:

FIG. 2 shows an example of code;

DESCRIPTION OF EXAMPLE EMBODIMENTS

Figure 1:
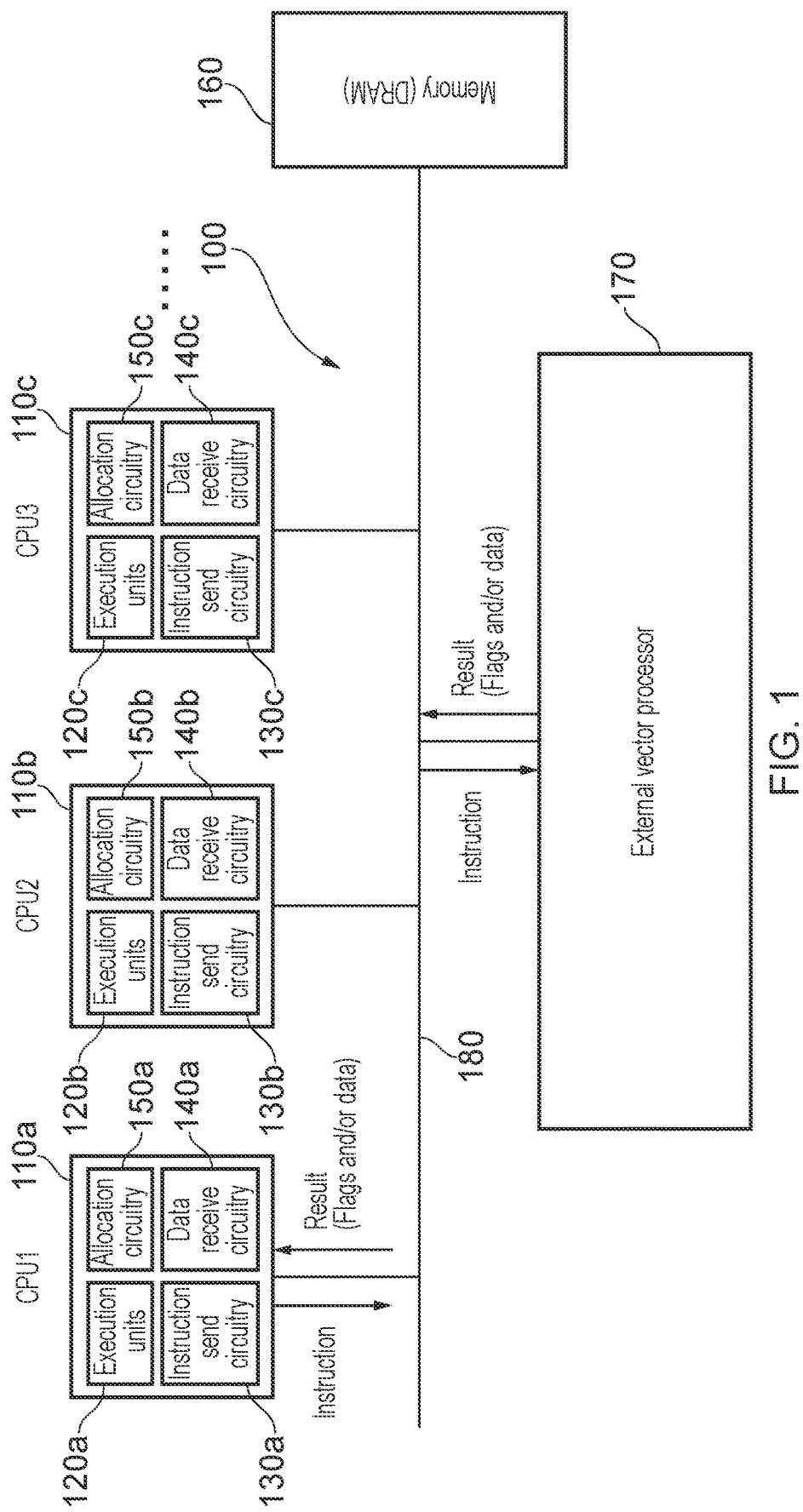
FIG. 1 illustrates a system containing a set of data processing apparatuses in accordance with some examples.

Before discussing the embodiments with reference to the accompanying figures, the following description of embodiments is provided.

In accordance with one example configuration there is provided a data processing apparatus comprising: instruction send circuitry configured to send an instruction to an external processor to be executed by the external processor; allocation circuitry configured to allocate a specified one of a plurality of registers for a result of the instruction having been executed on the external processor; and data receive circuitry configured to receive the result of the instruction having been executed on the external processor and to store the result in the specified one of the plurality of registers, wherein in response to a condition being met: the specified one of the plurality of registers is dereserved prior to the result being received by the data receive circuitry, and the result is discarded by the data receive circuitry when the result is received by the data receive circuitry.

In these examples, once the input resources (e.g. data values) required for an instruction's execution are available and once the required execution unit is free, the instruction can be sent for execution. One or more registers will be allocated or reserved for the instruction to be executed. In the case of an instruction that is to be sent to the external processor, the instruction is sent to the external processor as part of the commit process so a flush (e.g. that occurs as a consequence of speculation occurring incorrectly) will not cause the instruction to be rewound. The instruction is sent to an external processor (e.g. external to the data processing apparatus) to be executed and therefore has a long instruction latency (perhaps of the order of 50 to 100 cycles of the data processing apparatus). During this time, the one or more allocated resources cannot be used for another purpose. However, in certain circumstances, the allocation or reservation of the resource does not serve any useful purpose—e.g. where the data that is produced as a consequence of the instruction executing on the external processor is not actually used by the data processing apparatus. Consequently, the inventors of the present invention have realised that when a particular condition is met, it is possible to dereserve (remove the reservation) of the one or more reserved registers for the result. Furthermore, when the result data is received that would be stored into the one or more reserved registers, the result is simply discarded (since there is no longer a reserved register into which that result can be stored). This has the effect of reducing the number of registers that are reserved for an extended period and thereby inhibit the stalling of the data processing apparatus due to it not being possible to reserve a resource.

In some examples, the result comprises a condition flag that is from the instruction having been executed on the external processor. Execution flags could include, for instance, 'Z' a flag that is set if the instruction produced a zero, 'C' a carry flag if the instruction produced a carry result, 'S' a sign flag that indicates whether the result of the instruction is signed, and so on. Condition flags are clearly dependent on the underlying architecture. For instance, condition flags used in some of the Arm® architectures can be found at https://developer.arm.com/documentation/ddi0595/2021-06/AArch64-Registers/NZCV--Condition-Flags In some examples, the result comprises a data value that is from the instruction having been executed on the external processor. In these examples, the result is one or more data values that are explicitly produced from execution of the instruction as a result. For instance, the result might be the output of multiplying two vectors of floating point numbers together and accumulating the result.

In some examples, the external processor is shared among a plurality of data processing apparatuses including the data processing apparatus. The external processor may therefore be able to receive instructions from each of the data processing apparatuses, execute those instructions, and then return the result(s) back to the data processing apparatus that issued the relevant instruction. In this way, a large external processor can be provided in order to perform specialised tasks that are issued from any of the individual data processing apparatuses. The data processing apparatus may have the capability of arbitrating between the instructions that it receives to determine which instruction should be executed at each time.

In some examples, the instruction is a vector instruction. Vector instructions are instructions in which a single operation is performed on a vector (i.e. a set) of data values. For instance, a vector multiplication instruction might cause a set of integer (or floating point numbers) to each be multiplied by a single number or by another vector of data values. In general, each element of the vector can be processed in parallel. Consequently, a vector operation can proceed more efficiently than a standard scalar operation in which each element must be operated on one at a time. Typically, processors that are able to perform vector operations are large owing to the circuitry that is required to store, operate on, and return vectors, which require the storage of many bits of data.

In some examples, the allocation circuitry comprises rename circuitry configured to store relationships between physical registers and architectural registers; and the specified one of a plurality of registers is a physical register. Rename circuitry can be used to provide a correspondence between architectural registers that are recited in the instruction stream, and physical registers that actually store the results. By providing a larger set of physical registers it is possible to remove virtual dependencies between the registers and therefore allow for instruction reordering. This can be achieved by giving each instruction that outputs a result its own physical register (regardless of what the instruction stream indicates it should be) and then providing a virtual mapping between physical registers and architectural registers. The relationships therefore indicate how physical registers and architectural registers correspond to one another. The specified register whose use is reserved is a physical register, and this physical register is therefore unavailable for assignment to another architectural register until (under normal circumstances) the result to be stored in that register is obtained. Note that due to the long latency, physical registers assigned in this manner will normally remain in the rename circuitry for an extended period of time since until the result to be stored in that physical register is returned (under normal circumstances), the register cannot be used for another purpose without data corruption.

In some examples, the condition comprises a first requirement that the specified one of a plurality of registers is to be reserved for a further instruction committed to be executed. This requirement recognises that the register in question is to be allocated for a further instruction. If there is no need for the register to be assigned elsewhere (e.g. if the lack of reassignment would not cause a stall due to lack of available resources) then no reversal of the reservation takes place because there is nothing to be gained in doing so.

In some examples, the condition comprises a second requirement that contents of the specified one of the plurality of registers are either valid or unused. In these examples, in order for the reserved register to be released prior to the result being made available to be stored in that register, the first and second conditions are met. Firstly, the register in question is to be reserved for a further instruction. That is, if there is no need for the register to be assigned elsewhere (e.g. if the lack of reassignment would not cause a stall) then no reversal of the reservation takes place. Secondly, the result that would be stored in the register is not required or is no longer required. The first situation (where the result is not required) occurs when the result is unused. The second situation (where the result is valid) occurs when the data has already been retrieved and therefore any request to read the data has already been encountered. Therefore, if the release of the register is necessary and if the result to be stored in that register is not needed then it is okay to release/dereserve the register and allow it to be assigned elsewhere.

In some examples, the allocation circuitry comprises at least one flag associated with the specified one of the plurality of registers and configured to indicate that the contents of the specified one of the plurality of registers are unused. By indicating the data in this manner, it is possible to help determine whether the data can be released/reassigned.

In some examples, the allocation circuitry is configured to determine that the contents of the specified one of the plurality of registers are unused in response to the contents being unread prior to a request to reassign the specified one of the plurality of registers. If a write is made to the register that is reserved for receiving the result before the result is received and prior to any read being made of that same register then the result is unused. That is, if the sequence of operations performed on the register is write, write, read, then the first write (which comes from the result produced from the external processor) is irrelevant and need not actually be stored. Consequently, the reservation of the register to store that result can be reversed.

In some examples, the allocation circuitry comprises data discard circuitry configured to indicate, when set, that the result should be discarded by the data receive circuitry when the result is received by the data receive circuitry. The data discard circuitry can be used in order to track whether data that is received from the external processor should be kept or stored into a register. Clearly if the register that was originally assigned to receive the data has since been allocated to another instruction then it is inappropriate for the received data to be stored into that register—indeed, doing so would lead to data corruption. Such data should therefore be discarded. Of course, under other circumstances, the data would potentially be of use and would therefore be kept. The terms 'set' and 'cleared' conventionally refer to setting a bit value to '1' and '0' respectively. However, this need not be the case and the skilled person will appreciate that the notation can be trivially reversed.

In some examples, the data discard circuitry comprises a 1-bit field; and when the result is received and the 1-bit field is set, the result is discarded and the 1-bit field is cleared. The 1-bit field is therefore a toggle that indicates whether the next item of data (e.g. for a particular register) should be discarded. If set, the item of data is discarded and the toggle is reversed. If an item of data is received when the toggle is not set, then the data is kept.

In some examples, the data discard circuitry comprises an N-bit field, wherein N>1; and when the result is received and the N-bit field is other than a predetermined value, the result is discarded and the N-bit field moved closer to the predetermined value. In these examples, a number of instructions may be issued to the external processor in quick succession. The N-bit field can therefore be changed (e.g. incremented) in one direction when the associated physical register is dereserved and changed in the other direction (e.g. decremented) when the received data for that register is discarded. This allows a register to be reserved multiple times in a short space of time. For instance, register updates can be dropped from the external processor when the value of this N-bit field is not zero (assuming that the changes are inverses of each other, e.g. +/−1). 'N' therefore represents the number of times that a register can be assigned to an instruction within a particular window of time.

In some examples, the N-bit field is associated with the plurality of registers including the one of the plurality of registers and is configured to indicate whether results including the result of a plurality of instructions including the instruction, are unused. Rather than providing one bitfield per register, it is possible to provide a single bitfield for all registers. In some examples, the bitfield acts as a counter and is incremented whenever a register reservation is undone in the manner described above. If the counter is non-zero when a result is received from the external processor then that result is discarded and the counter is decremented. This assumes that results are received from the external processor in an order corresponding to the instructions that were issued to it from the data processing apparatus. By using a single large counter, rather than numerous smaller ones, it is possible to better avoid the chance of an individual bitfield overflowing using the same number of bits.

Particular embodiments will now be described with reference to the figures.

FIG. 1 illustrates a system 100 containing a set of data processing apparatuses 110$a$, 110$b$, 110$c$ in accordance with some examples. In these examples, the data processing apparatuses take the form of CPUs, each of which contains execution units 120$a$, 120$b$, 120$c$ (e.g. ALUs, FPUs, etc.) for executing local instructions. In addition, the CPUs 110$a$, 110$b$, 110$c$ are connected via a bus 180 to a main memory 160 (e.g. backed by DRAM) and an external vector processor 170, which is distinct from at least some of the CPUs. Each of the CPUs is able to issue an instruction (e.g. a vector instruction) to the external vector processor 170 via instruction send circuitry 130$a$, 130$b$ 130$c$. The instruction will, in due course, be executed by the external vector processor 170 and a result (e.g. data and/or execution flags) will be returned to the CPU 110$a$, 110$b$, 110$c$ via data receive circuitry 140$a$, 140$b$, 140$c$.

Between the process of the instruction being sent and the result being received, it is typically necessary for one or more registers in the CPU 110$a$, 110$b$, 110$c$ to be reserved in order to store the result(s) that might be received. The register(s) is/are reserved so that there is somewhere to store the result when it is received. A difficulty that can arise is that it might take many processor cycles for an instruction to be issued to the external vector processor 170. It therefore may not take many instructions for all the registers to be reserved and when there are no more registers left to allocate, execution will stall. In the case of condition flags, when an instruction is decoded, it is known which possible condition flags could be produced and so register reservation can be made statically based on the instruction opcode. In some architectures, the condition flags are either all produced or none are produced. The flags can therefore be treated as a single register (potentially having a smaller width that a regular register).

The present technique makes it possible to recognise a situation in which the result is not actually required by the CPU 110$a$, 110$b$, 110$c$. In this situation, the reservation can be removed, allowing the register to be used for other instructions. The result, when it is received, is then discarded since no register has been allocated to store the result. However, since the result is not actually required, discarding the result is acceptable.

FIG. 2 shows an example of code in which such a situation arises. The code is part of a routine that is designed to find the maximum value from a set of values and its corresponding index within the set (the full code can be found in Section B1.1, page 61 of the Arm document SVE programming examples). The code works by loading values from memory into a vector (z6) with one value per lane and comparing that vector to a vector that stores the largest values seen in each lane so far (z5). For each lane having a pair of elements (one in one vector and one in another), it is determined which is larger and the results being stored in register p6. The maximum values from each lane are then stored (via the SMAX instruction) into the vector of largest values seen per lane so far (z5). Meanwhile, the index associated with the largest values is updated (via the SEL instruction) into a set of indexes (z10) of the corresponding largest values seen per lane so far (z5). This process is continued until the vector is complete. This is determined via a predicated loop counter system via the WHILELT instruction in which x8 stores the length of the vector.

In practice, further code is required after the loop is complete to traverse z5 and return the biggest element and its corresponding index. However, such code is not relevant to the discussion at hand.

The 'z' registers are only executed in the external vector processor 170. Consequently, any instruction that accesses the z registers is executed in the external vector processor 170 rather than the CPU 110$a$, 110$b$, 110$c$. Instructions that use other registers can be executed in the external vector processor 170 or the CPU 110$a$, 110$b$, 110$c$. However, any non-z registers that are modified in the external vector processor 170 are returned to the CPU 110$a$, 110$b$, 110$c$ that issued the instruction (together with any condition flag changes).

The main comparison taking place occurs in the instruction CMPGT. However, the data from that instruction is stored in a register p6, which is only used by other instructions (SEL) that execute on the external vector processor 170. Consequently, although the data stored in p6 will be returned to whichever of the CPUs 110$a$, 110$b$, 110$c$ that issued the instructions to the external vector processor 170 in the first place, the data in that register is not actually used. Similarly, execution of the CMPGT instruction might alter condition flags and those condition flags may also be forwarded back to the CPU 110$a$, 110$b$, 110$c$ that issued the instruction. However, none of the code described here actually uses the execution flags for anything.

Consequently, when a CPU 110$a$, 110$b$, 110$c$ issues such instructions to the external vector processor 170, registers will be reserved in order to receive the results of the execution (p6 and potentially execution flags). Yet that data is not used and consequently, registers are reserved unnecessarily. If numerous registers are reserved in this manner in a short space of time, the CPU 110a, 110b, 110c will stall.

The present technique seeks to recognise this situation and eliminate such register reservations.

Figure 3:
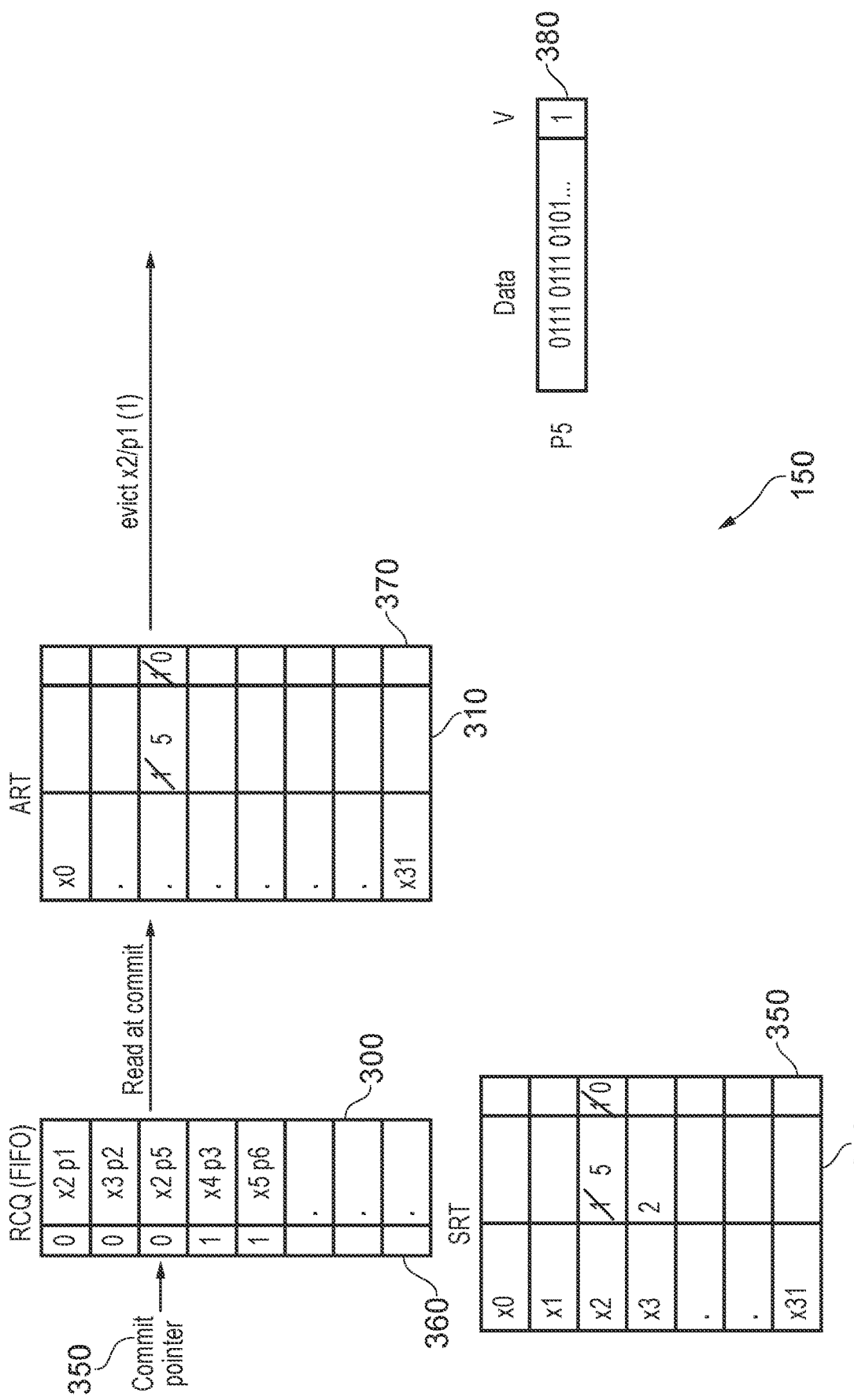
FIG. 3 shows an example of the allocation circuitry.

FIG. 3 shows an example of the allocation circuitry 150, which in this example takes the form of register rename circuitry. The rename circuitry is made up from a number of tables 300, 310, 330, 340. When an instruction is encountered, an allocation is made into the Speculative Rename Table (SRT) 340 for any destination register belonging to that instruction. In particular, a mapping is made between an architectural register specified in the instruction and the identity of a physical register into which the data is actually stored. The SRT 340 stores the latest mapping that is intended to be used.

The updating of the SRT 340 also causes an entry to be stored in the RCQ 360. Whereas the SRT 340 stores a currently intended overall mapping, the RCQ stores a history of mappings that have been made. This is provided so that in the event of a pipeline flush, a rewind of the register mappings can be made. A commit pointer 350 points to one of these entries to indicate the next instruction to be committed (which commits the instruction to be performed and commits the register mapping that up until this point has been speculative).

In these examples, locally executed instructions are executed and then committed. In contrast, instructions that are sent to the external processor 170 are committed (i.e. will not be flushed) before being sent to the external processor. At this point, the Architectural Register Table) ART 310 is updated. This shows a committed mapping between architectural registers and physical registers and indicates how registers have been reserved. When a mapping is entered into the ART, the old mapping that has been evicted is 'popped'. This represents a register mapping that is no longer needed because another instruction is now going to write to that register and therefore replace the data in it.

A register is reallocated when: (i) it is no longer required (e.g. it is popped from the ART) and (ii) the data for the previous instruction for which the register was allocated has already been acquired. This second requirement can be achieved by the means of a validity flag 380 associated with the register which is set to 'invalid' when the register is assigned and then set to 'valid' when data is written to that register. If an instruction (e.g. a read instruction) seeks to use a register that is set to 'invalid' the instruction is prohibited from being issued and neither that instruction, nor any later instruction can be committed until the register becomes valid. This ensures that read instructions do not execute until the data that they read is actually available.

As explained earlier, this setup is unsatisfactory where there is a long latency for the result of the earlier instruction to be written, such as when the instruction is to be executed by the external processor. In particular, it may take many processor cycles for the result of the earlier instruction to be returned from the external processor. Meanwhile, until the result is received, the register is marked as 'invalid' and therefore the register cannot be reallocated, so as to avoid potential data corruption. If this happens to all registers, then the system stalls.

One might be tempted to simply ignore the validity requirement, expecting a write-after-write to be considered to be 'null code' ideally factored out by a compiler. Nevertheless, there are situations where a write-after-write is valid such as when writing to a register causes a particular behaviour to occur (e.g. writing to an output device) or such as the present situation where it is required by the architecture to provide near-seamlessness between a CPU 110a, 110b, 110c and an external processor and it is therefore not possible or impractical to factor out such register writes.

In order to help avoid these problems, each of the tables 300, 310, 340 maintains a field 360, 370, 350 that is associated with each register (or register mapping). In the example of FIG. 3, the field is 1-bit. Initially, this bit is set (e.g. to 1) for an entry when the corresponding instruction is sent to the external vector processor. For any bit that is set, the bit can then be flipped when an instruction is encountered on the CPU 110a, 110b, 110c that reads the corresponding register (e.g. when an instruction that reads the register is entered into the issue queue). The value of the field 360, 370, 350 is propagated through the tables 300, 310, 340.

When an entry is to be evicted from the ART 310 (e.g. when another instruction seeks to write to the register), the field is checked.

If the field 360, 370, 350 is still set then the instruction is an instruction that has been sent to the external vector processor 170 and whose contents will not be read. This is because no 'read' instruction has been encountered prior to the later instruction seeking to write to the same register. This register can therefore be reused for the new instruction. However, it is necessary to take note that any incoming result must be discarded so as to not overwrite/corrupt the data that is now going to be stored in the reused register. This discarding process is described with reference to FIG. 4.

If the field 360, 370, 350 has been flipped then either the instruction was not sent to the external vector processor (e.g. it was instead handled by the CPU 110a, 110b, 110c) or a read of the data will take place (that is, the result of the instruction is actually required). In either case, the usual register freeing mechanism that relies on validity of the data, is used. In particular, until the data is received, the corresponding register will remain 'invalid'. Once the data is received, any read instructions are able to take place. Later instructions that seek to write to the register will be unable to commit until the earlier read instructions are committed (since the instructions typically commit in order—e.g. using a commit pointer).

Note that in this example, the field 360, 370, 350 is made up of a single bit associated with each register that indicates whether both that register has been read and that the instruction to which that register is allocated is issued to an external processor. The field 360, 370, 350 could instead be made up of a pair of bits associated with each register—the first to indicate whether the register has been read and the second to indicate whether the instruction to which that register is allocated is issued to an external processor.

Figure 4:
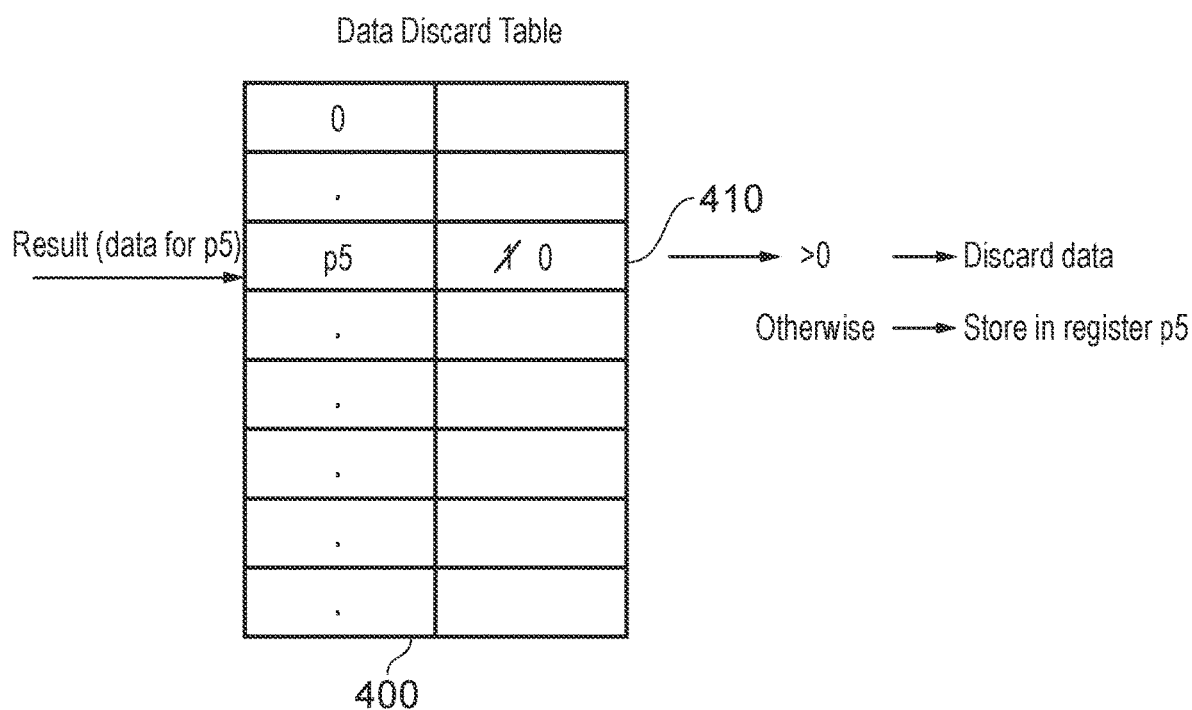
FIG. 4 shows a Data Discard Table (DDT) that also might be part of the allocation circuitry.

FIG. 4 shows a Data Discard Table (DDT) 400 that also might be part of the allocation circuitry 150a, 150b, 150c. The DDT stores information relating to data that is to be discarded when it is received. As discussed with respect to FIG. 3, this is relevant for entries that are evicted from the ART with the field 360, 370, 350 set. When such an entry is evicted, a counter 410 for the corresponding entry for the physical register is incremented (e.g. to 1). When data for that register is received by the external vector processor 170, the counter 410 is decremented. If the counter 410 is zero, then the data is stored in the indicated register and otherwise the data is discarded.

The counter 410 could be a 1-bit 'counter' (i.e. that simply indicates discard/do not discard). However, such a counter 410 is prone to overflowing. Indeed, if an overflow of the counter 410 would occur then the entry from the ART cannot be removed and so the reallocation of the particular register has to wait until the data is returned. An overflow might occur in the event that a large number of instructions in close proximity to each other all write to the same architectural register. In this case, the architectural register will be continually freed (using the mechanism described above) and eventually a physical register will have more than one item of data to be discarded when it arrives.

Figure 5:
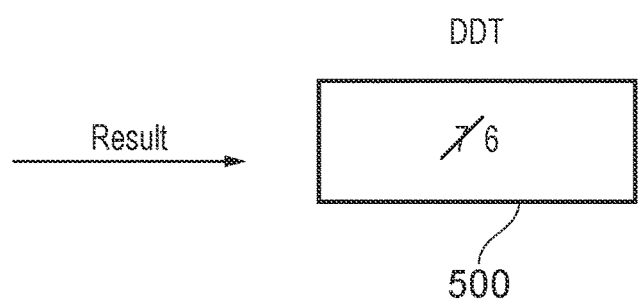
FIG. 5 shows a technique in which one counter is associated with all registers.

There are a number of ways that this can be overcome. One is to simply increase the size of the counter 410. Another technique is illustrated in FIG. 5, which is to simply have one counter 500 for all registers, which is decremented each time a result is received from the external vector processor 170 and incremented each time a register is 'dereserved' using the process shown with respect to FIG. 4 (or vice-versa). Provided data arrives back from the external vector processor 170 in the order in which instructions are sent to it from a CPU 110a, 110b, 110c, then as long as the counter is non-zero, any incoming result can be discarded and otherwise the data can be stored.

Figure 6:
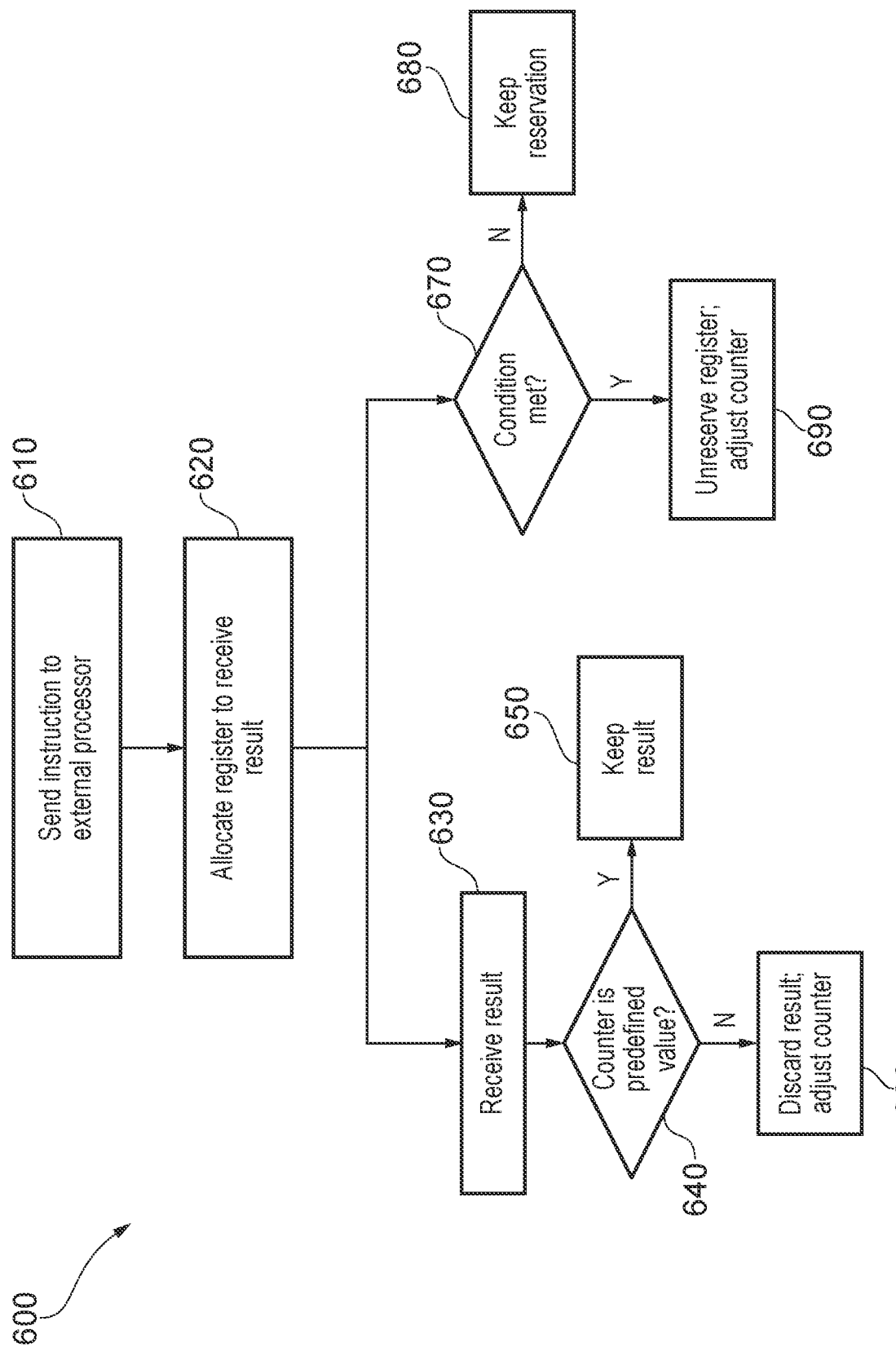
FIG. 6 shows a flowchart in accordance with some examples.

FIG. 6 shows a flowchart 600 in accordance with some examples. At a step 610, an instruction is sent to an external processor. At a step 620, a register is allocated to receive a result from that instruction. The result could take the form of an condition flag or an item of data returned from execution of the instruction.

It will be appreciated that the relative ordering of these two steps could be reversed depending on the underlying architecture.

The process then splits into two branches, which can be carried out in parallel.

In a first branch the result is received at a step 630. It is then determined whether the counter 410 associated with the physical register into which the data would be stored (or a general purpose counter for all registers 500) is a predefined value (e.g. zero). If so, then the result is discarded and the counter is adjusted (e.g. incremented) in a first direction at a step 660. If not, then the result is kept (e.g. stored into the register) at step 650.

In a second branch, it is determined whether one or more conditions are met at a step 670. For instance, these conditions could be (i) that another instruction seeks to write to the same register and (ii) either the value stored in the register is unused or is valid. This latter condition could be met using a flag as shown in FIG. 4, to indicate that the instruction is not read before the another instruction seeks to write to the same register. In any event, if the condition(s) are met then the register is unreserved and the counter is adjusted at step 690 (e.g. it is decremented). The adjustment occurs in the opposite manner to that of step 660. Otherwise, if the condition(s) are not met then the reservation is kept at step 680.

In accordance with the above, it will be appreciated that in a situation in which registers are reserved for storing the results send to external processors (or other external devices) it is possible to recognise a situation in which the reservation serves no useful purpose. Consequently, the register can be dereserved thereby freeing resources up.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The application could be configured in accordance with the following clauses:

1. A data processing apparatus comprising:
    instruction send circuitry configured to send an instruction to an external processor to be executed by the external processor;
    allocation circuitry configured to allocate a specified one of a plurality of registers for a result of the instruction having been executed on the external processor; and
    data receive circuitry configured to receive the result of the instruction having been executed on the external processor and to store the result in the specified one of the plurality of registers, wherein
    in response to a condition being met:
        the specified one of the plurality of registers is dereserved prior to the result being received by the data receive circuitry, and the result is discarded by the data receive circuitry when the result is received by the data receive circuitry.
2. The data processing apparatus according to clause 1, wherein
    the result comprises a condition flag that is from the instruction having been executed on the external processor.
3. The data processing apparatus according to any preceding clause, wherein
    the result comprises a data value that is from the instruction having been executed on the external processor.
4. The data processing apparatus according to any preceding clause, wherein
    the external processor is shared among a plurality of data processing apparatuses including the data processing apparatus.
5. The data processing apparatus according to any preceding clause, wherein
    the instruction is a vector instruction.
6. The data processing apparatus according to any preceding clause, wherein
    the allocation circuitry comprises rename circuitry configured to store relationships between physical registers and architectural registers; and
    the specified one of a plurality of registers is a physical register.
7. The data processing apparatus according to any preceding clause, wherein
    the condition comprises a first requirement that the specified one of a plurality of registers is to be reserved for a further instruction committed to be executed.
8. The data processing apparatus according to clause 7, wherein
    the condition comprises a second requirement that contents of the specified one of the plurality of registers are either valid or unused.

9. The data processing apparatus according to clause 8, wherein
the allocation circuitry comprises at least one flag associated with the specified one of the plurality of registers and configured to indicate that the contents of the specified one of the plurality of registers are unused.

10. The data processing apparatus according to any one of clauses 8-9, wherein
the allocation circuitry is configured to determine that the contents of the specified one of the plurality of registers are unused in response to the contents being unread prior to a request to reassign the specified one of the plurality of registers.

11. The data processing apparatus according to any preceding clause, wherein
the allocation circuitry comprises data discard circuitry configured to indicate, when set, that the result should be discarded by the data receive circuitry when the result is received by the data receive circuitry.

12. The data processing apparatus according to clause 11, wherein
the data discard circuitry comprises a 1-bit field; and
when the result is received and the 1-bit field is set, the result is discarded and the 1-bit field is cleared.

13. The data processing apparatus according to any one of clauses 11-12, wherein
the data discard circuitry comprises an N-bit field, wherein N>1; and
when the result is received and the N-bit field is other than a predetermined value, the result is discarded and the N-bit field moved closer to the predetermined value.

14. The data processing apparatus according to clause 13, wherein
the N-bit field is associated with the plurality of registers including the one of the plurality of registers and is configured to indicate whether results including the result of a plurality of instructions including the instruction, are unused.

15. A data processing method comprising:
sending an instruction to an external processor to be executed by the external processor;
allocating a specified one of a plurality of registers for a result of the instruction having been executed on the external processor; and
receiving the result of the instruction having been executed on the external processor and to store the result in the specified one of the plurality of registers, wherein
in response to a condition being met:
the specified one of the plurality of registers is dereserved prior to the result being received by the data receive circuitry, and the result is discarded by the data receive circuitry when the result is received by the data receive circuitry.

16. A non-transitory computer-readable medium to store computer-readable code for fabrication of a data processing apparatus comprising:
instruction send circuitry configured to send an instruction to an external processor to be executed by the external processor;
allocation circuitry configured to allocate a specified one of a plurality of registers for a result of the instruction having been executed on the external processor; and
data receive circuitry configured to receive the result of the instruction having been executed on the external processor and to store the result in the specified one of the plurality of registers, wherein
in response to a condition being met:
the specified one of the plurality of registers is dereserved prior to the result being received by the data receive circuitry, and the result is discarded by the data receive circuitry when the result is received by the data receive circuitry.

We claim:

1. A data processing apparatus comprising:
instruction send circuitry configured to send an instruction to an external processor to be executed by the external processor;
allocation circuitry configured to allocate a specified one of a plurality of registers for a result of the instruction having been executed on the external processor; and
data receive circuitry configured to receive the result of the instruction having been executed on the external processor and to store the result in the specified one of the plurality of registers, wherein
in response to a condition being met:
the specified one of the plurality of registers is dereserved prior to the result being received by the data receive circuitry, and the result is discarded by the data receive circuitry when the result is received by the data receive circuitry.

2. The data processing apparatus according to claim 1, wherein
the result comprises a condition flag that is from the instruction having been executed on the external processor.

3. The data processing apparatus according to claim 1, wherein
the result comprises a data value that is from the instruction having been executed on the external processor.

4. The data processing apparatus according to claim 1, wherein
the external processor is shared among a plurality of data processing apparatuses including the data processing apparatus.

5. The data processing apparatus according to claim 1, wherein
the instruction is a vector instruction.

6. The data processing apparatus according to claim 1, wherein
the allocation circuitry comprises rename circuitry configured to store relationships between physical registers and architectural registers; and
the specified one of a plurality of registers is a physical register.

7. The data processing apparatus according to claim 1, wherein
the condition comprises a first requirement that the specified one of a plurality of registers is to be reserved for a further instruction committed to be executed.

8. The data processing apparatus according to claim 7, wherein
the condition comprises a second requirement that contents of the specified one of the plurality of registers are either valid or unused.

9. The data processing apparatus according to claim 8, wherein
the allocation circuitry comprises at least one flag associated with the specified one of the plurality of registers and configured to indicate that the contents of the specified one of the plurality of registers are unused.

10. The data processing apparatus according to claim 8, wherein the allocation circuitry is configured to determine that the contents of the specified one of the plurality of registers are unused in response to the contents being unread prior to a request to reassign the specified one of the plurality of registers.

11. The data processing apparatus according to claim 1, wherein
the allocation circuitry comprises data discard circuitry configured to indicate, when set, that the result should be discarded by the data receive circuitry when the result is received by the data receive circuitry.

12. The data processing apparatus according to claim 11, wherein
the data discard circuitry comprises a 1-bit field; and
when the result is received and the 1-bit field is set, the result is discarded and the 1-bit field is cleared.

13. The data processing apparatus according to claim 11, wherein
the data discard circuitry comprises an N-bit field, wherein N>1; and
when the result is received and the N-bit field is other than a predetermined value, the result is discarded and the N-bit field moved closer to the predetermined value.

14. The data processing apparatus according to claim 13, wherein
the N-bit field is associated with the plurality of registers including the one of the plurality of registers and is configured to indicate whether results including the result of a plurality of instructions including the instruction, are unused.

15. A data processing method comprising:
sending an instruction to an external processor to be executed by the external processor;
allocating a specified one of a plurality of registers for a result of the instruction having been executed on the external processor; and
receiving the result of the instruction having been executed on the external processor and to store the result in the specified one of the plurality of registers, wherein
in response to a condition being met:
the specified one of the plurality of registers is dereserved prior to the result being received by the data receive circuitry, and the result is discarded by the data receive circuitry when the result is received by the data receive circuitry.

16. A non-transitory computer-readable medium to store computer-readable code for fabrication of a data processing apparatus comprising:
instruction send circuitry configured to send an instruction to an external processor to be executed by the external processor;
allocation circuitry configured to allocate a specified one of a plurality of registers for a result of the instruction having been executed on the external processor; and
data receive circuitry configured to receive the result of the instruction having been executed on the external processor and to store the result in the specified one of the plurality of registers, wherein
in response to a condition being met:
the specified one of the plurality of registers is dereserved prior to the result being received by the data receive circuitry, and the result is discarded by the data receive circuitry when the result is received by the data receive circuitry.

* * * * *